United States Patent
Bhat et al.

(10) Patent No.: US 10,915,884 B2
(45) Date of Patent: Feb. 9, 2021

(54) PROCESSING MOBILE PAYMENTS WHEN DISCONNECTED FROM PAYMENT SERVERS

(71) Applicant: INTERNATIONAL BUSINESS MACHINES CORPORATION, Armonk, NY (US)

(72) Inventors: Badekila Ganesh Prashanth Bhat, Bangalore (IN); Krishna C. Kumar, Bangalore (IN); Mohan Pattadai, Bangalore (IN); Sachin M. Nayak, Bangalore (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 452 days.

(21) Appl. No.: 15/844,947

(22) Filed: Dec. 18, 2017

(65) Prior Publication Data

US 2019/0130386 A1 May 2, 2019

Related U.S. Application Data

(63) Continuation of application No. 15/796,062, filed on Oct. 27, 2017.

(51) Int. Cl.
*G06Q 40/00* (2012.01)
*G06Q 20/32* (2012.01)
(Continued)

(52) U.S. Cl.
CPC ....... *G06Q 20/3278* (2013.01); *G06Q 20/102* (2013.01); *G06Q 20/322* (2013.01);
(Continued)

(58) Field of Classification Search
None
See application file for complete search history.

(56) References Cited

U.S. PATENT DOCUMENTS

| 10,049,349 B1 | 8/2018 | Grassadonia et al. |
| 10,366,378 B1 | 7/2019 | Han et al. |

(Continued)

FOREIGN PATENT DOCUMENTS

| WO | 2010132963 | 11/2010 |
| WO | 2014014526 | 1/2014 |

(Continued)

OTHER PUBLICATIONS

Office Action in related U.S. Appl. No. 15/796,062 dated Jun. 15, 2020, 8 pages.*

(Continued)

*Primary Examiner* — Olabode Akintola
(74) *Attorney, Agent, or Firm* — Aaron Pontikos; Andrew D. Wright; Roberts Calderon Safran & Cole, P.C.

(57) ABSTRACT

A computer-implemented method includes: providing, by a merchant computing device, an offline payment request to a user device when the merchant computing device is disconnected from a payment server, wherein the offline payment request is provided via local communications between the user device and the merchant computing device; receiving, by the merchant computing device, a payment approval message associated with the offline payment request based on providing the offline payment request, wherein the payment approval message is received via the local communications between the user device and the merchant computing device; storing, by the merchant computing device, the payment approval message; and providing, by the merchant computing device, offline transaction information corresponding to the payment approval message to the payment (Continued)

server when connectivity to the payment server has been restored.

20 Claims, 9 Drawing Sheets

(51) Int. Cl.
*G06Q 20/36* (2012.01)
*G06Q 30/06* (2012.01)
*G06Q 20/10* (2012.01)
*G06Q 20/40* (2012.01)
*H04W 4/80* (2018.01)

(52) U.S. Cl.
CPC ....... *G06Q 20/3274* (2013.01); *G06Q 20/367* (2013.01); *G06Q 20/401* (2013.01); *G06Q 30/06* (2013.01); *H04W 4/80* (2018.02)

(56) References Cited

U.S. PATENT DOCUMENTS

| | | | |
|---|---|---|---|
| 2010/0043061 A1* | 2/2010 | Martin | H04W 12/08 726/4 |
| 2012/0296742 A1* | 11/2012 | Patwa | G06Q 30/0242 705/14.54 |
| 2013/0151405 A1 | 6/2013 | Head et al. | |
| 2013/0179352 A1 | 7/2013 | Dwyre et al. | |
| 2014/0188703 A1* | 7/2014 | Tse | G06Q 20/32 705/39 |
| 2014/0244507 A1 | 8/2014 | Udd | |
| 2016/0021171 A1* | 1/2016 | Zourzouvillys | H04L 67/1095 709/207 |
| 2016/0110718 A1 | 4/2016 | Jajara et al. | |
| 2017/0053268 A1 | 2/2017 | Pande | |
| 2018/0144339 A1* | 5/2018 | Beidas | G06Q 30/06 |
| 2018/0260795 A1* | 9/2018 | Maenpaa | G06Q 20/3433 |

FOREIGN PATENT DOCUMENTS

| | | | | |
|---|---|---|---|---|
| WO | WO 2014/014526 | * | 1/2014 | ............. G06Q 20/04 |
| WO | 2014162309 | | 10/2014 | |
| WO | 2014174345 | | 10/2014 | |

OTHER PUBLICATIONS

Mell et al., "The NIST Definition of Cloud Computing", NIST, Special Publication 800-145, Sep. 2011, 7 pages.

Specification "Processing Mobile Payments When Disconnected From Payment Servers" and Drawings in U.S. Appl. No. 15/796,062, filed Oct. 27, 2017, 57 pages.

List of IBM Patents or Patent Applications Treated as Related 1 page.

Office Action in related U.S. Appl. No. 15/796,062 dated Feb. 20, 2020, 12 pages.

Notice of Allowance in related U.S. Appl. No. 15/796,062 dated Jun. 15, 2020, 9 pages.

Notice of Allowance in related U.S. Appl. No. 15/796,062 dated Jun. 24, 2020, 7 pages.

* cited by examiner

PROCESSING MOBILE PAYMENTS WHEN DISCONNECTED FROM PAYMENT SERVERS

BACKGROUND

The present invention generally relates to processing mobile payments and, more particularly, to processing mobile payments when disconnected from payment servers.

User devices (e.g., mobile smartphones, tablets, smart watches, smart fitness bands, smart wearable computing devices, etc.) may be used to make electronic mobile payments using an electronic wallet ("e-wallet"). For example, a user device may provide account information to a merchant payment system, and the user device and/or the merchant payment system may communicate (e.g., through an external network) with payment servers (e.g., credit card/bank servers) to process the payment. In conventional mobile payment systems, a network connection between the user device, the merchant payment system, and payment servers may be required.

SUMMARY

In an aspect of the invention, a computer-implemented method includes: providing, by a merchant computing device, an offline payment request to a user device when the merchant computing device is disconnected from a payment server, wherein the offline payment request is provided via local communications between the user device and the merchant computing device; receiving, by the merchant computing device, a payment approval message associated with the offline payment request based on providing the offline payment request, wherein the payment approval message is received via the local communications between the user device and the merchant computing device; storing, by the merchant computing device, the payment approval message; and providing, by the merchant computing device, offline transaction information corresponding to the payment approval message to the payment server when connectivity to the payment server has been restored.

In an aspect of the invention, there is a computer program product for facilitating offline transactions. The computer program product includes a computer readable storage medium having program instructions embodied therewith, the program instructions executable by a user device to cause the user device to: receive an offline payment request from a merchant payment system via local communications; provide a payment approval message to the merchant payment system via the local communications to cause the merchant payment system to store the payment approval message and provide offline transaction information to the payment server corresponding to the payment approval message; and provide the offline transaction information to the payment server corresponding to the payment approval message to the payment server when the user device and the payment server are connected via a network.

In an aspect of the invention, a system includes: a CPU, a computer readable memory and a computer readable storage medium associated with a payment server; program instructions to receive offline transaction information identifying a transaction that took place when a merchant payment system was disconnected from the payment server; program instructions to determine whether a transaction identifier included in the transaction information was previously received; program instructions to process a payment based on the offline transaction information when the transaction identifier was not previously received; program instructions to ignore the offline transaction information when the transaction identifier was previously received. The program instructions are stored on the computer readable storage medium for execution by the CPU via the computer readable memory

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
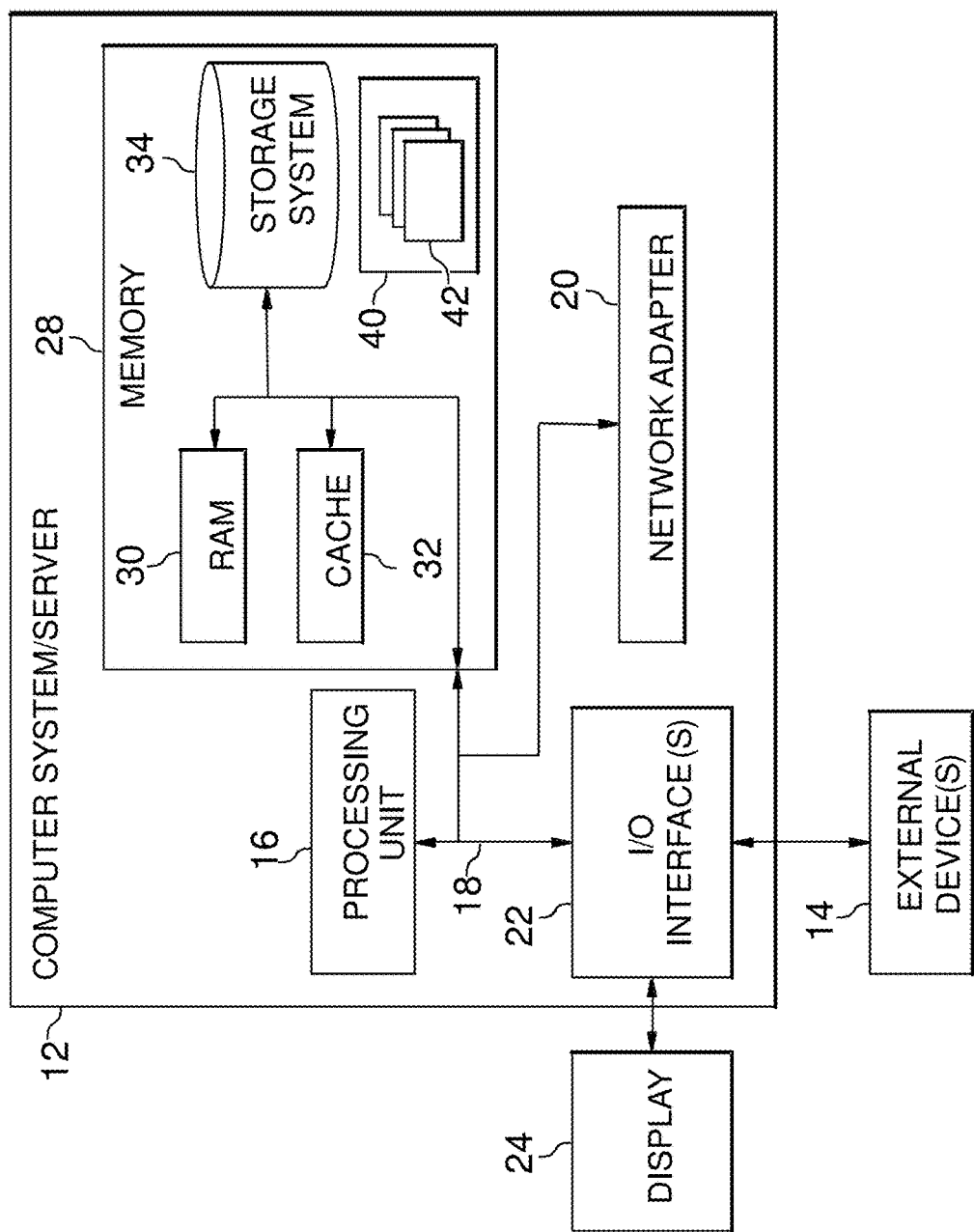
FIG. 1 depicts a cloud computing node according to an embodiment of the present invention.

The present invention generally relates to processing mobile payments and, more particularly, to processing mobile payments when disconnected from payment servers. Processing a mobile payment may require network connectivity in order for a user device and/or a merchant payment system to communicate with payment servers and process the mobile payment. Aspects of the present invention may process a mobile payment even without a connection to payment servers (e.g., "offline payments"). Advantageously, mobile payments may be made to make purchases in a situation when network connectivity is unavailable, such as during a natural disaster in which network infrastructure may be damaged, when cellular networks are congested, or in some other situation in which network connectivity is unavailable.

As described herein, an e-wallet may store information for one or more credit cards, debit cards, gift cards, and/or other articles used to make electronic payments. The e-wallet may be linked to a user device, and the user device may be set to an "offline payment mode" in which offline payments may be made using a payment method from the e-wallet. As described herein, the "offline payment mode" may be a mode in which offline payments are able to be made from the user device when external network connectivity is unavailable. However, when a user device is set to an offline payment mode and external network connectivity is available, mobile payments may still be made using the external network connectivity, but offline payments may also be made when external network connectivity is unavailable. In embodiments, the offline payment mode may only be set for one user device for a given e-wallet to prevent overdrawing of accounts. Aspects of the present invention may transfer the offline payment mode from one user device to another user device such that only one user device using a given e-wallet is set to the offline payment mode.

In accordance with aspects of the present invention, a user device and a merchant payment system may communicate via local network communications to process an offline payment. For example, the user device and the merchant payment system may synchronize transaction details and store a record of an offline transaction (e.g., a bank or credit card account used for the transaction, an ID of an e-wallet used for the transaction, an amount of the transaction, etc.). As described herein, the user device and merchant payment system may communicate and synchronize transaction details via a local network. As used herein, a "local network" may include a personal area network (PAN) (e.g., a ZigBee network, Z-Wave network, Bluetooth Network, etc.), a near-field communications network (NFC), a wired or wireless local area network (LAN), a universal serial bus (USB) network, or the like. Additionally, or alternatively, local network communications may include communications via local code scanning of codes (e.g., Quick Response (QR) codes, bar codes, etc.) generated on the user device and the merchant payment system in which the QR codes include transaction details.

When network connectivity is restored to either the user device or the merchant payment system, a payment server may receive, from the user device or the merchant payment system, details of offline transactions made, and may process the offline transactions accordingly (e.g., by debiting an account of the user device and crediting an account of the merchant payment system). To prevent a transaction from being processed twice (e.g., when network connectivity is restored on a user device in which the user device provides offline transaction details to the payment server, and when network connectivity is later restored on the merchant payment system in which the merchant payment system provides offline transaction details), the payment server may store records with identifiers of transactions that have been processed, and may refrain from processing a transaction having the same transaction identifier more than once.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
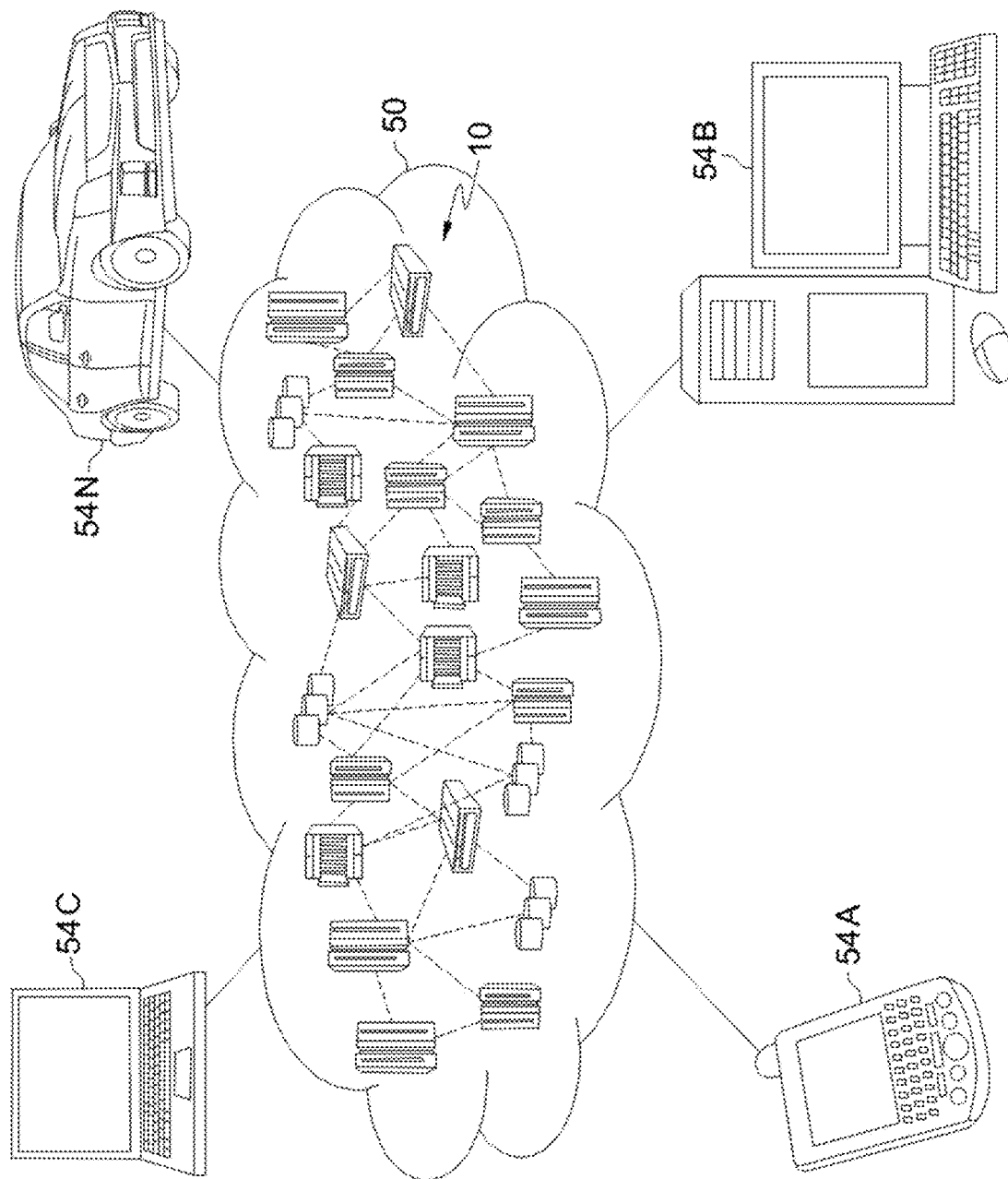
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
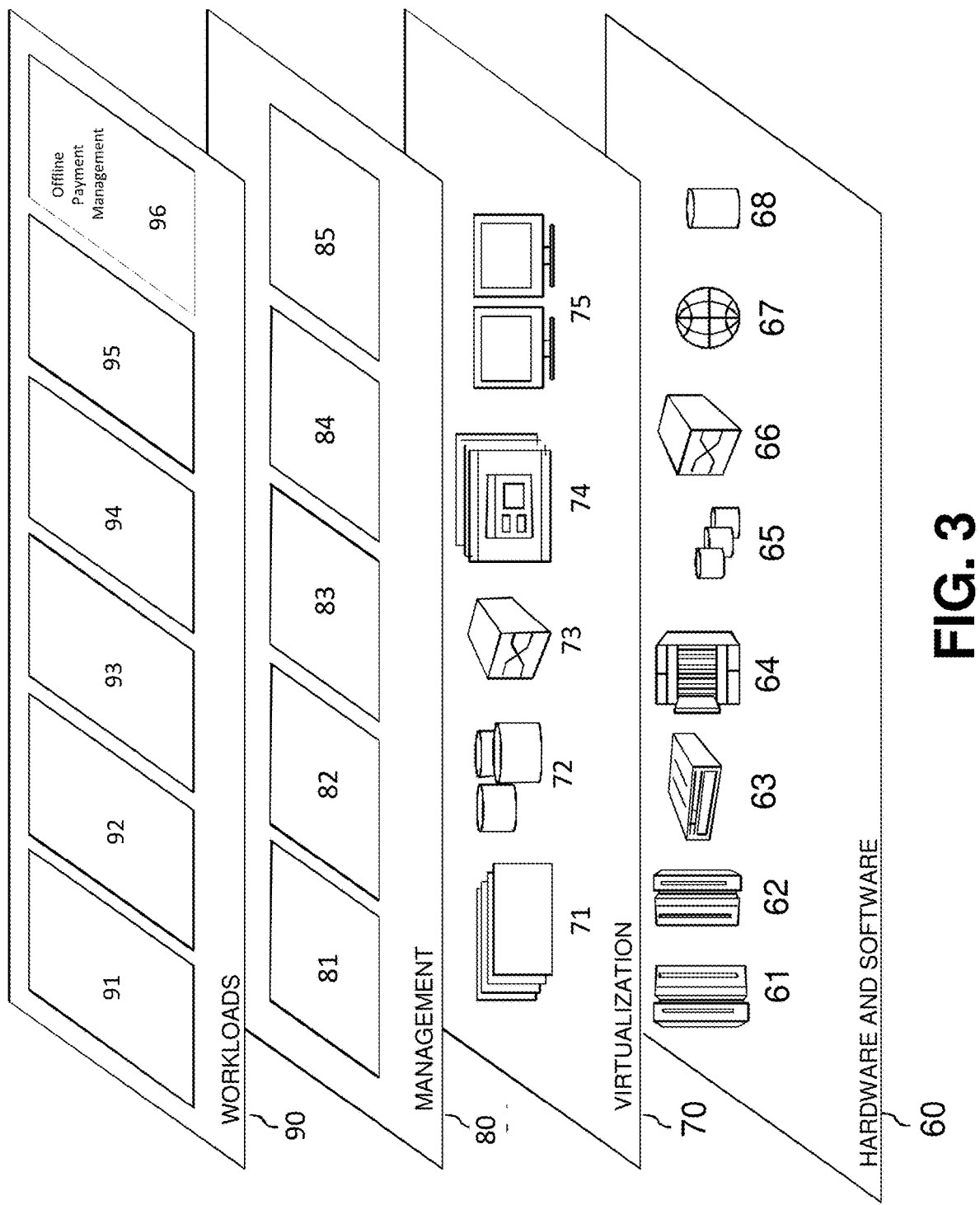
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and offline payment management 96.

Referring back to FIG. 1, the program/utility 40 may include one or more program modules 42 that generally carry out the functions and/or methodologies of embodiments of the invention as described herein (e.g., such as the functionality provided by offline payment management 96). Specifically, the program modules 42 may enable or disable a user device for offline payments, manage e-wallet preferences, receive offline transaction records, and process the offline transaction records. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a payment server as shown in FIG. 4.

Figure 4:
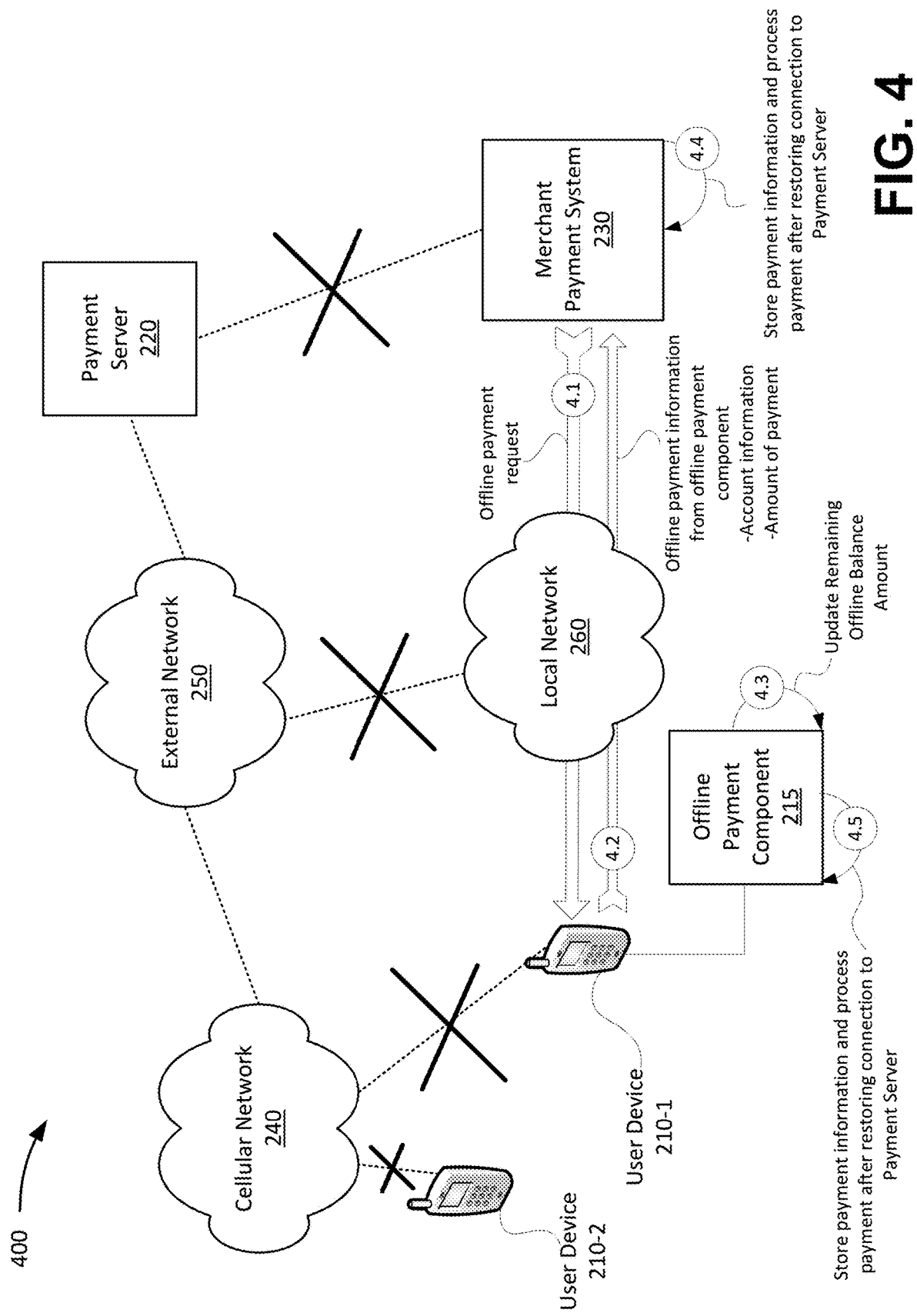
FIG. 4 shows an example environment and an overview of an example implementation in accordance with aspects of the present invention.

FIG. 4 shows an example environment and an overview of an example implementation in accordance with aspects of the present invention. As shown in FIG. 4, environment 400 may include one or more user devices 210 (e.g., user device 210-1 and user device 210-2), a payment server 220, a merchant payment system 230, a cellular network 240, an external network 250, and a local network 260. In embodiments, one or more components in environment 400 may correspond to one or more components in the cloud computing environment of FIG. 2. In embodiments, one or more components in environment 400 may include the components of computer system/server 12 of FIG. 1.

The user device 210 may include a computing device capable of communicating via a network, such as a cellular network 240, an external network 250, and/or a local network 260. For example, the user device 210 may correspond to a mobile communication device (e.g., a smartphone or a personal digital assistant (PDA)), a portable computer device (e.g., a laptop or a tablet computer), or another type of computing device. In some embodiments, the user device 210 may store payment information for making mobile payments. In embodiments, the payment information may be stored in an e-wallet.

As further shown in FIG. 4, the user device 210 may include a offline payment component 215. The offline payment component 215 may include an application (e.g., implemented by one or more program modules 42 of FIG. 1) and/or a data storage system (e.g., storage system 34 of FIG. 1) that stores and updates information regarding a remaining balance that is available for offline transactions. In embodiments, the offline payment component 215 may be used to receive an offline payment request, and provide offline payment information to make an offline payment in response to the offline payment request. Additionally, or alternatively, the offline payment component 215 may enable, disable, and/or transfer an offline payment mode. In embodiments, multiple different user devices 210 (e.g., user device 210-1 and user device 210-2) may communicate with each other locally to transfer the offline payment mode from one user device 210 to the other.

The payment server 220 may include one or more computing devices (e.g., such as computer system/server 12 of FIG. 1) that processes a payment for a transaction when transaction details are received from the user device 210 and/or the merchant payment system 230. In embodiments, the payment server 220 may immediately process a transaction when the user device 210 and/or the merchant payment system 230 is online (e.g., connected to the payment server 220). In accordance with aspects of the present invention, the payment server 220 may process an offline transaction (e.g., a transaction that occurs when a connection to the payment server 220 is unavailable) once details of the offline transaction have been received by the user device 210 and/or the merchant payment system 230 (e.g., when the user device 210 and/or the merchant payment system 230 re-establish a connection with the payment server 220). Additionally, or alternatively, the payment server 220 may manage the status of an offline transaction mode to ensure that only one user device 210 associated with a given e-wallet is enabled for conducting offline transactions (e.g., to prevent payment accounts from being overdrawn or offline reserve amounts from being exceeded which may occur if multiple user devices 210 were enabled for making offline transactions).

The merchant payment system 230 may include one or more computing devices (e.g., such as computer system/server 12 of FIG. 1) that may receive electronic payment information from the user device 210 for processing a mobile payment (e.g., either an online or offline payment). For example, the merchant payment system 230 may include an electronic credit card reader with mobile pay capabilities, a payment terminal, a scanner, or the like. The merchant payment system 230 may receive input for a transaction (e.g., articles/merchandise in the transaction), and make a payment request to receive payment for the transaction. When the merchant payment system 230 is offline (e.g., disconnected from the payment server 220), the merchant payment system 230 may provide an offline payment request to the user device 210 via the local network 260, receive offline payment information from the user device 210 corresponding to the offline payment request, store the offline payment information, and provide the offline payment information to the payment server 220 after re-establishing a connection with the payment server 220.

The cellular network 240 may include network nodes, such as network nodes 10 of FIG. 2. Additionally, or alternatively, the cellular network 240 may include one or more wired and/or wireless networks associated with a cellular network. For example, the cellular network 240 may include a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like.

The external network 250 may include a wide area network (WAN), a metropolitan network (MAN), the Public Switched Telephone Network (PSTN), an ad hoc network, a managed Internet Protocol (IP) network, a virtual private network (VPN). Additionally, or alternatively, the external network 250 may include the Internet, a fiber optic-based network, and/or a combination of these or other types of networks.

The local network 260 may include a Local Area Network (LAN), a wireless LAN (WLAN), an NFC network, a PAN (e.g., a ZigBee network, a Z-wave network, a Bluetooth network), a USB network, or the like. Additionally, or alternatively, the local network 260 may include communications associated with the scanning of bar codes, QR codes, or the like (e.g., via a scanner or camera implemented within the user device 210 and/or the merchant payment system 230). In embodiments, a router, gateway, hub, or similar network device may host a local network 260 (e.g., a LAN or WLAN) for local communications between the user device 210 and the merchant payment system 230. For example, the network device may be located within a merchant's facility to hose the local network 260 in order for the user device 210 and the merchant payment system 230 to communicate to process offline transactions without the need for the user device 210 and/or the merchant payment system 230 to have a connection to the payment server 220. Alternatively, a network device need not be used, and the user device 210 and the merchant payment system 230 be communicate directly via a local network 260 that does not require the use of a network device.

The quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4. Also, in some implementations, one or more of the devices of the environment 400 may perform one or more functions described as being performed by another one or more of the devices of the environment 400. Devices of the environment 400 may interconnect via wired connections, wireless connections, or a combination of wired and wireless connections.

In the example shown in FIG. 4, the local network 260 is disconnected from the external network 250 and is hence disconnected from the payment server 220. The user device 210 is disconnected from the cellular network 240 and hence, is disconnected from the external network 250 and the payment server 220. Further, the merchant payment system 230 is connected to the local network 260, but is disconnected from the payment server 220 (e.g., since the local network 260 is disconnected from the payment server 220). In embodiments, the user device 210 and/or the merchant payment system 230 may be disconnected from the payment server 220 during a network outage, network congestion/overload, and/or other similar situation. In this scenario, the user device 210 (e.g., user device 210-1) and the merchant payment system 230 may be unable to process mobile payments through communication with the payment server 220. In accordance with aspects of the present invention, the user device 210 and the merchant payment system 230 may communicate with each other via the local network 260 to process an offline transaction (e.g., a transaction that occurs when a connection to the payment server 220 is unavailable and occurs without requiring a connection to the payment server 220 at the time of the transaction).

As shown in FIG. 4, the merchant payment system 230 may provide an offline payment request to the user device 210 via the local network 260 (step 4.1). For example, the merchant payment system 230 may provide an offline payment request having details of a transaction for which payment is requested (e.g., an amount of the transaction based on the items/quantities in the transaction). In embodiments, the offline payment request may be generated after the merchant payment system 230 has been used to scan items in a transaction and when a connection to the payment server 220 is unavailable. The offline payment request may be in the form of a computer file having a particular data structure and a header indicating that the offline payment request is for an offline payment, rather than an online payment. Additionally, or alternatively, the offline payment request may be in the form of a QR code that is displayed on a display of the merchant payment system 230.

In embodiments, the user device 210 may receive the offline payment request via the local network 260, and provide offline payment information from the offline payment component 215 (step 4.2). For example, the user device 210 may receive the offline payment request via a network device hosting the local network 260, or through a direct network connection between the user device 210 and the merchant payment system 230 (e.g., ZigBee, Z-wave, Bluetooth, NFC, PAN connection, etc.). Additionally, or alternatively, if the payment request is in the form of a QR code displayed in the merchant payment system 230, the user device 210 may receive the offline payment request through a camera device to scan the QR code. For example, a user of the user device 210 may orient the user device 210 such that the camera of the user device 210 is able to scan the QR code.

Based on receiving the offline payment request, the user device 210 may identify that the payment request is an offline payment request, and the offline payment component 215 may determine that offline payments are enabled on the offline payment component 215. Further, the offline payment component 215 may determine that an available balance to make the payment is sufficient (e.g., an amount that was previously reserved for offline payments). A user of the user device 210 may provide user input to make the payment, and in turn, the user device 210 may generate an offline payment response having the payment information (e.g., account number, amount of payment corresponding to the amount of the payment request). At step 4.2, the user device 210 may provide the offline payment information to the merchant payment system 230 (e.g., in a similar manner as the user device 210 received the offline payment request). For example, the user device 210 may provide the offline payment information by generating a QR code that the merchant payment system 230 may scan, or through another type of communications protocol associated with the local network 260.

At step 4.3, the offline payment component 215 may update a remaining offline balance amount that may be used for future offline transactions. At step 4.4, the merchant payment system 230 may store the offline payment information and may process the payment after restoring a connection to the payment server 220. For example, the merchant payment system 230 may send the offline payment information to the payment server 220 at a later time (e.g., after the transaction) after restoring a connection to the payment server 220, and the payment server 220 may use the offline payment information to process the offline transaction (e.g., by crediting an account of the merchant payment system 230 and debiting an account of the user device 210). At step 4.5, the user device 210 may also provide the offline payment information to process the offline transaction after restoring a connection to the payment server 220. To prevent the offline transaction from being processed twice, the offline payment information may include a transaction ID. In embodiments, the payment server 220 may process only one offline transaction per transaction ID. By having each of the user device 210 and the merchant payment system 230 provide offline transaction/payment information to the payment server 220 when a connection is reestablished, the payment server 220 may processes the offline transaction as quickly as possible based on which of the user device 210 and the merchant payment system 230 restores connectivity to the payment server 220 first. In embodiments, offline transaction/payment information may be transferred to another device that has a connection to the payment server 220 such that the offline transaction can be processed.

Figure 5:
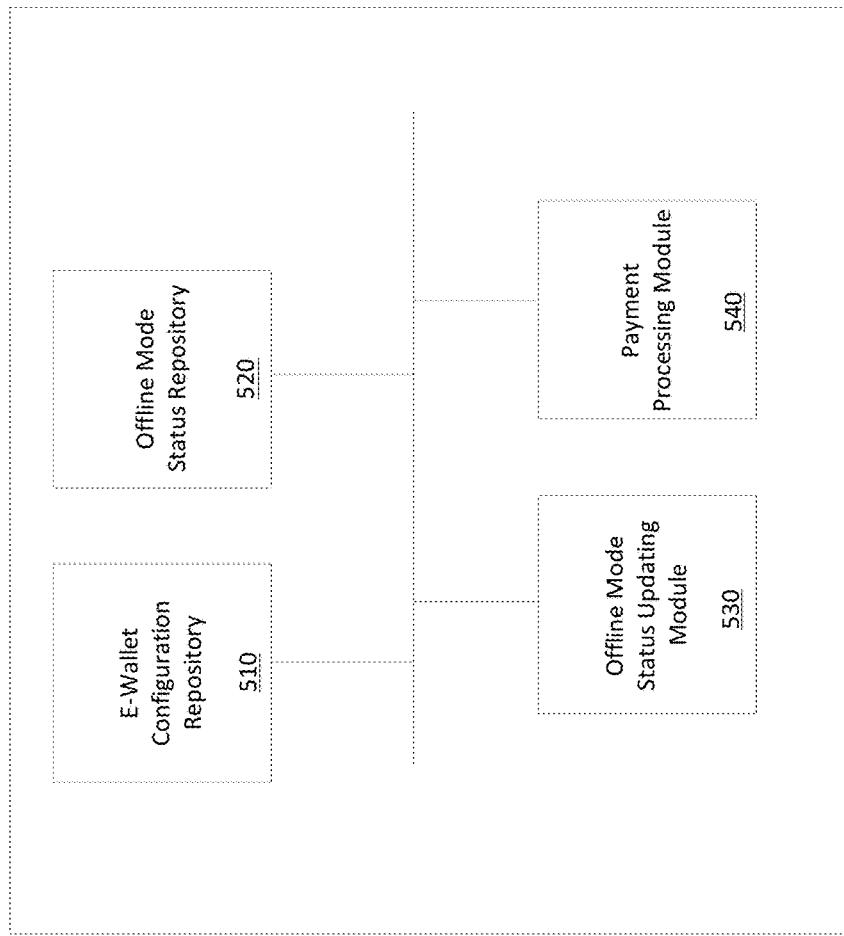
FIG. 5 shows a block diagram of example components of a payment server in accordance with aspects of the present invention.

FIG. 5 shows a block diagram of example components of a payment server in accordance with aspects of the present invention. As shown in FIG. 5, the payment server 220 may include an e-wallet configuration repository 510, an offline mode status repository 520, an offline mode status updating module 530, and an payment processing module 540. In embodiments, the payment server 220 may include additional or fewer components than those shown in FIG. 5. In embodiments, separate components may be integrated into a single computing component or module. Additionally, or alternatively, a single component may be implemented as multiple computing components or modules.

The e-wallet configuration repository 510 may include a data storage device (e.g., storage system 34 of FIG. 1) that stores information regarding the details and configuration of an e-wallet. For example, the e-wallet configuration repository 510 may store individual data structures for each e-wallet. In embodiments, each data structure may include an identifier of the e-wallet, an owner of the e-wallet, one or more user devices 210 associated with the e-wallet, and one or more payment accounts associated with the e-wallet (e.g., credit card accounts, bank accounts, etc.). The e-wallet configuration repository 510 may also store information identifying an offline reserve amount for the e-wallet, and more specifically, an offline reserve amount for each payment account associated with the e-wallet. Additionally, or alternatively, the e-wallet configuration repository 510 may store other configuration and/or preferences, such as a list of vendors for which offline payments should be accepted.

The offline mode status repository 520 may include a data storage device (e.g., storage system 34 of FIG. 1) that stores the offline mode status for user devices 210 associated with a given e-wallet. As described herein, the "offline mode status" indicates whether a particular user device 210 is able to make offline transactions using the e-wallet (e.g., transactions that may be made when the user device 210 and/or the merchant payment system 230 are disconnected from the payment server 220). As described herein, only one user device 210 associated with a given e-wallet may be enabled for offline mode status. As further described herein, a user device 210, when the offline mode status is enabled, may still make online transactions (e.g., transactions that occur when the user device 210 and/or the merchant payment system 230 are connected to the payment server 220). In embodiments, the offline mode status repository 520 may store information indicating whether a user device 210 is enabled for the offline mode.

The offline mode status updating module 530 may include a program module (e.g., program module 42 of FIG. 1) that updates the offline mode status for a user device 210. For example, the offline mode status updating module 530 may receive a request to update the offline mode status for a user device 210 (e.g., from "enabled" to "disabled" or vice versa). When receiving a request to enable the offline mode for a first user device 210-1 associated with a e-wallet ID, the offline mode status updating module 530 may determine whether the offline mode is enabled for a second user device 210-2 associated with the same e-wallet ID. If the offline mode is enabled for the second user device 210-2, the offline mode status updating module 530 may communicate with the offline mode status updating module 530 to disable the offline mode on the offline mode status updating module 530, and enable the offline mode on the first user device 210-1. If the second user device 210-2 is disconnected from the payment server 220 (and hence, unable to receive a command from the offline mode status updating module 530 to disable its offline mode), the offline mode status updating module 530 may send an error message to the first user device 210-1 that the offline mode cannot be enabled for the first user device 210-1. In this way, the offline mode status updating module 530 may ensure that the offline mode is enabled only for one user device 210 to prevent offline transactions from occurring from multiple user devices 210 for the same e-wallet, thus preventing overdrawing of payment accounts against an available offline balance. As later described, the offline mode may be transferred between two user devices 210 when the user devices 210 are disconnected from the payment server 220 through local communications between the two user devices 210. For example, the user device 210-1 and the user device 210-2 may communicate locally via a local network 260 to transfer the offline mode.

The payment processing module 540 may include a program module (e.g., program module 42 of FIG. 1) that processes payments for both online and offline transactions. For an online transaction, the payment processing module 540 may receive a payment authorization message from the user device 210 and/or the merchant payment system 230 at the time of the transaction. For an offline transaction, the payment processing module 540 may receive an offline payment transaction message from the user device 210 and/or the merchant payment system 230 when either the user device 210 or the merchant payment system 230 reestablish a connection with the payment server 220. To prevent a transaction from being processed twice, the payment processing module 540 may check the transaction ID included in an offline transaction message and refrain from processing a transaction whose transaction ID was previously processed.

Figure 6:
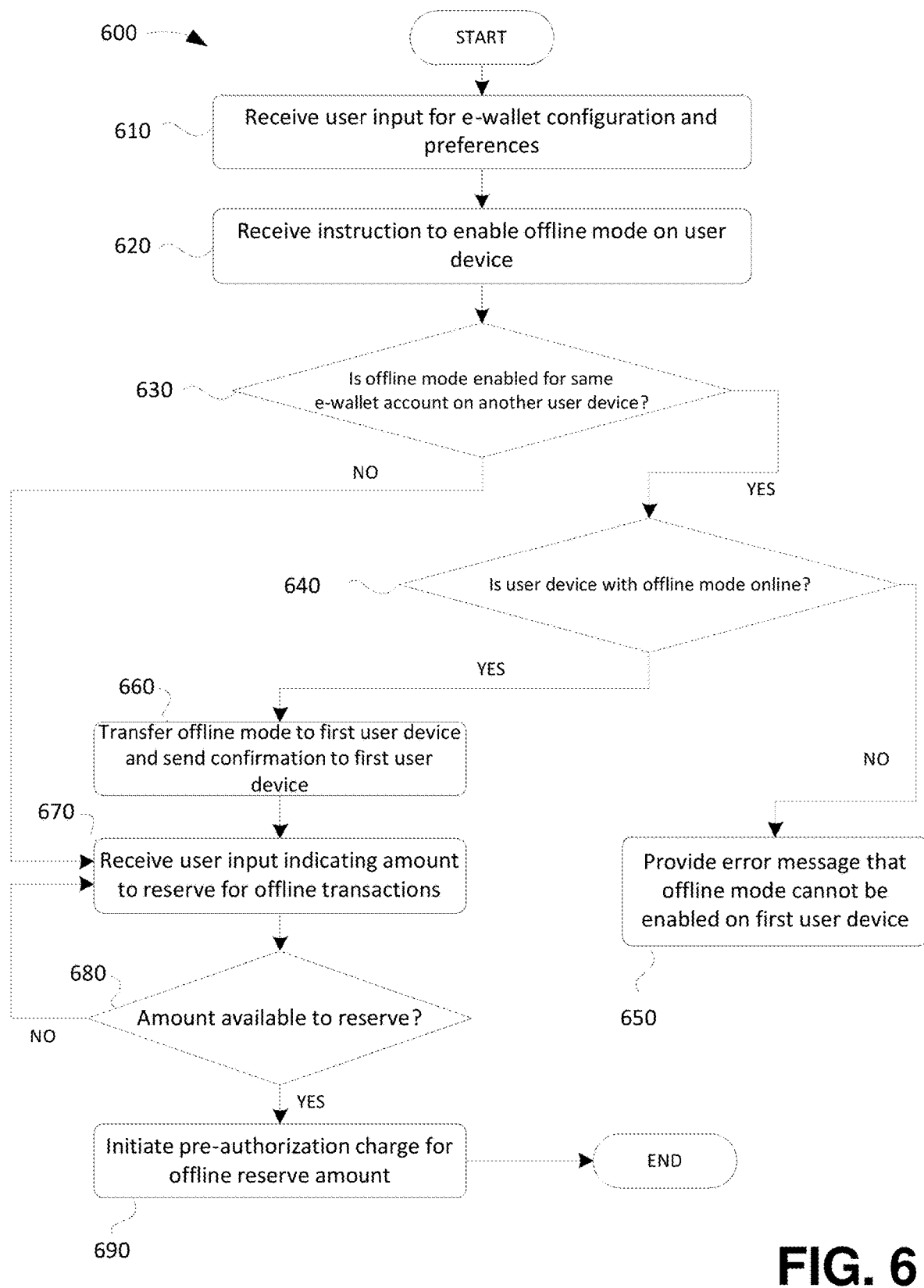
FIG. 6 shows an example flowchart of a process for enabling an offline mode for a user device in accordance with aspects of the present invention.

FIG. 6 shows an example flowchart of a process for enabling an offline mode for a user device. The steps of FIG. 6 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

As shown in FIG. 6, process 600 may include receiving user input for e-wallet configuration and preferences (step 610). For example, as described above with respect to the e-wallet configuration repository 510, the payment server 220 may receive user input for e-wallet configuration and preferences. In embodiments, the payment server 220 may receive the user input from a first user device 210-1 via an application, web portal, or the like. For example, a user may enter, via a user interface of user device 210-1, login credentials to access an e-wallet account, and may interact with a user interface to enter configuration and preference information for the e-wallet. In embodiments, the user may use the user interface to provide information to associate one or more user devices 210 with the e-wallet, and associate one or more payment accounts associated with the e-wallet (e.g., credit card accounts, bank accounts, etc.).

Process 600 may also include receiving an instruction to enable the offline mode for the user device 210 (step 620). For example, as described above with respect to the offline mode status updating module 530, the payment server 220 may receive an instruction to enable the offline mode for the user device 210-1. In embodiments, the payment server 220 may receive the instruction via an application, web portal, or the like (e.g., after the user has logged in to their e-wallet account, as described above with respect to step 610).

Process 600 may further include determining whether the offline mode is enabled for the same e-wallet account on another user device (step 630). For example, as described above with respect to the offline mode status updating module 530, the payment server 220 may determine whether the same e-wallet account (e.g., based on ID of the e-wallet account) is enabled for another user device 210. In embodiments, the offline mode status updating module 530 may make this determination based on information stored by the offline mode status repository 520.

If, for example, the offline mode is not enabled for another user device 210 (e.g.,user device 210-2), process 600 may proceed to step 670, as described in greater detail below. If, on the other hand, the offline mode is enabled for user device 210-2, process 600 may include, at step 640, determining whether the user device 210-2 is currently online (e.g., connected to the payment server 220). If, for example, user device 210-2 is not online (step 640—NO), process 600 may include providing an error message that the offline mode cannot be enabled on user device 210-1 (step 650). For example, when the user device 210-2 is offline, the payment server 220 may be unable to disable the offline mode on the user device 210-2, and hence, will not enable the offline mode on user device 210-1. In this way, the payment server 220 may prevent multiple user devices 210 from having the offline mode enabled.

If, at step 640, the user device 210-2 is online (step 640—YES), process 600 may include transferring the offline mode to user device 210-1 and sending a confirmation to user device 210-1 (step 660). For example, the payment server 220 may transfer the offline mode to user device 210-1 from user device 210-2 by sending a command to user device 210-2 to disable its offline mode. The payment server 220 may also update the offline mode status stored by offline mode status repository 520 to reflect that the offline mode has been transferred from user device 210-2 to user device 210-1.

Process 600 may also include receiving user input indicating an amount to reserve for offline transactions (step 670). For example, as described above with respect to the e-wallet configuration repository 510, the payment server 220 may receive, from user device 210-1, user input indicating an amount to reserve for offline transactions. In embodiments, a user may provide user input by entering the amount using the an application and user interface on user device 210-1. In embodiments, the payment server 220 may receive user input indicating an amount to reserve for offline transactions using a particular payment account (e.g., a particular credit card account, bank account, gift card account, etc.).

Process 600 may further include determining whether the amount is available to reserve (step 680). For example, the payment server 220 may determine whether the amount is available to reserve by comparing the entered amount (from step 670) to an available balance on a selected payment account. Specifically, if the entered amount from step 670 is less than or equal to an available balance on a payment account (e.g., an available credit limit balance on a credit card account, or an available remaining balance on a bank account or gift card account), the payment server 220 may determine that the amount is available to reserve (step 680—YES).

When the amount is not available to reserve (step 680—NO), process 600 may return to step 670 in which the payment server 220 will again receive user input indicating an amount to reserve for offline transactions. In embodiments, the payment server 220 may indicate that the previous amount entered was unavailable to reserve and that the user should enter a lower amount.

When the amount is available to reserve (step 680—YES), process 600 may include initiating a pre-authorization charge for the offline reserve amount (step 690). For example, the payment server 220 may pre-authorize a charge for the offline reserve amount so that the reserve amount is available for offline transactions, and so that when other transactions are made, an available balance is not exceeded. If, at a later time, the user may opt to release the funds for use in online transactions (e.g., transactions that occur when the user device 210-1 and/or the merchant payment system 230 are connected to the payment server 220). For example, the user may provide user input to user device 210 to modify the offline reserve amount, or disable offline mode altogether in order to release a portion or all of the offline reserve amount.

Figure 7:
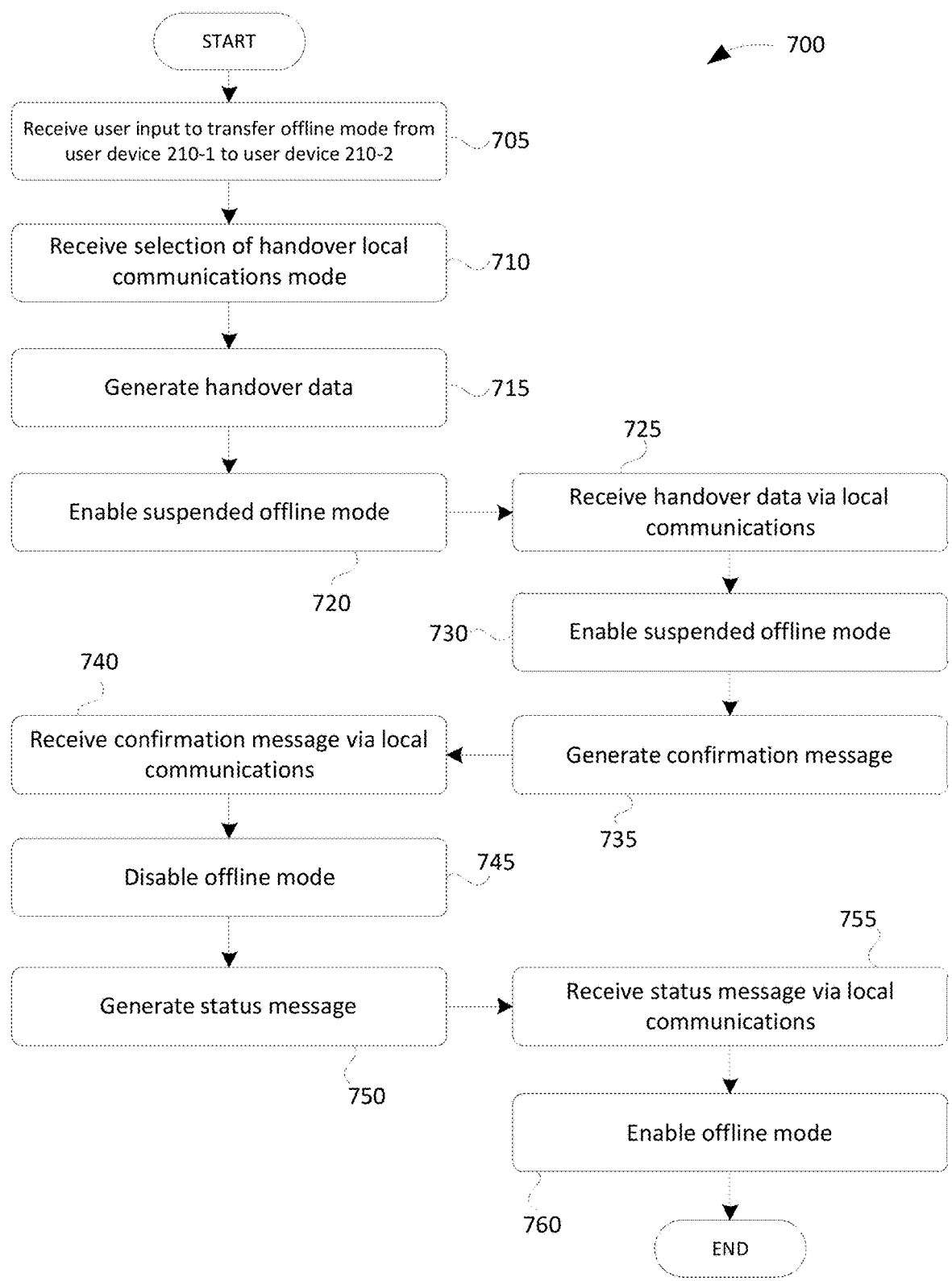
FIG. 7 shows an example flowchart of a process for transferring the offline mode from one user device to another when both user devices are offline in accordance with aspects of the present invention.

FIG. 7 shows an example flowchart of a process for transferring the offline mode from one user device to another when both user devices are offline. The steps of FIG. 7 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention. In FIG. 7, process steps on the left-hand side may be performed by the user device 210-1 and process steps on the right-hand side may be performed by the user device 210-2.

As shown in FIG. 7, process 700 may include receiving user input to transfer the offline mode for user device 210-1 to user device 210-2 (step 705). For example, in FIG. 7, assume that user device 210-1 initially is an "enabled offline mode" in which the offline mode is enabled. User device 210-1 may receive user input (e.g., from a user via a user interface of an application) an instruction to transfer or "handover" the offline mode from user device 210-1 to user device 210-2.

Process 700 may also include receiving a selection of a handover local communications mode (step 710). For example, user device 210-1 may receive a selection of a handover local communications mode via the user interface of the application. The handover local communications mode may include a communications mode via which user device 210-1 and user device 210-2 may locally communicate. For example, the handover local communications mode may include an NFC connection, PAN connection, LAN connection, ZigBee connection, Bluetooth connection, Z-wave connection, and/or other similar type of local communications connection. As described herein, the user device 210-1 may host a type of local network 260 in which the type of network corresponds to the handover local communications mode. As described herein, the local network 260 may be used to locally transmit data between user device 210-1 and user device 210-2 to handover the offline mode. In embodiments, the handover local communications mode may include the generation of a QR code on user device 210-1 that may be scanned by user device 210-2 to transmit data between the user device 210-1 and the user device 210-2.

Process 700 may further include generating handover data (step 715). For example, the user device 210-1 may generate handover data that identifies the an ID of the e-wallet for which offline mode is currently enabled on the user device 210-1, and a remaining balance for each of the payment accounts in the e-wallet. In embodiments, the data may be generated in the form of a computer file, or a QR code that carries the data (e.g., when the handover local communications mode selected at step 710 is a QR code).

Process 700 may also include enabling a suspended offline mode (step 720). For example, the user device 210-1 may temporarily suspend its offline mode until the transfer of the offline mode to user device 210-2 has been completed and confirmed, as described in greater detail herein.

Process 700 may further include receiving handover data via local communications (step 725). For example, the user device 210-2 may receive the handover data (generated at step 715) from the user device 210-1 via the local network 260. If the handover local communications mode selected at step 710 is a QR code, the user may orient user device 210-2 to scan the QR code generated and displayed by the user device 210-1 to receive the handover data.

Process 700 may further include enabling a suspended offline mode (step 730). For example, the user device 210-2 may move to a "suspended offline mode" from a "disabled offline mode." User device 210-2 may be set to the "suspended offline mode" until it is confirmed that the offline mode on user device 210-1 has been disabled.

Process 700 may also include generating a confirmation message (step 735). For example, the user device 210-2 may generate a confirmation message that indicates that the user device 210-2 has received the handover data from the user device 210-1. In embodiments, the confirmation message may be in the form of a QR code that is displayed on the user device 210-2.

Process 700 may further include receiving the confirmation message via the local communications (step 740). For example, the user device 210-1 may receive the confirmation from the user device 210-2 via the local network 260. If the local communications mode is a QR code and the confirmation message is in the form of a QR code, the user of user device 210-1 may orient user device 210-1 to scan the QR code displayed on the user device 210-2.

Process 700 may also include disabling the offline mode (step 745). For example, the user device 210-1 may move from a "suspended offline mode" to a "disabled offline mode" such that the user device 210-1 may no longer be used to make offline transactions.

Process 700 may further include generating a status message (step 750). For example, the user device 210-1 may generate a status message indicating that the user device 210-1 is in a "disabled offline mode". In embodiments, the status message may be in the form of a QR code or computer file, depending on the local communications mode selected at step 710.

Process 700 may also include receiving the status message via local communications (step 755). For example, the user device 210-2 may receive the status message via the local network 260. When the status message is in the form of a QR code, the user of user device 210-2 may orient the user device 210-2 to scan the QR code displayed on the user device 210-1.

Process 700 may further include enabling the offline mode (step 760). For example, the user device 210-2 may move from a "suspended offline mode" to an "enabled offline mode" based on receiving the status message confirming that the offline mode has been disabled on the user device 210-1.

Figure 8:
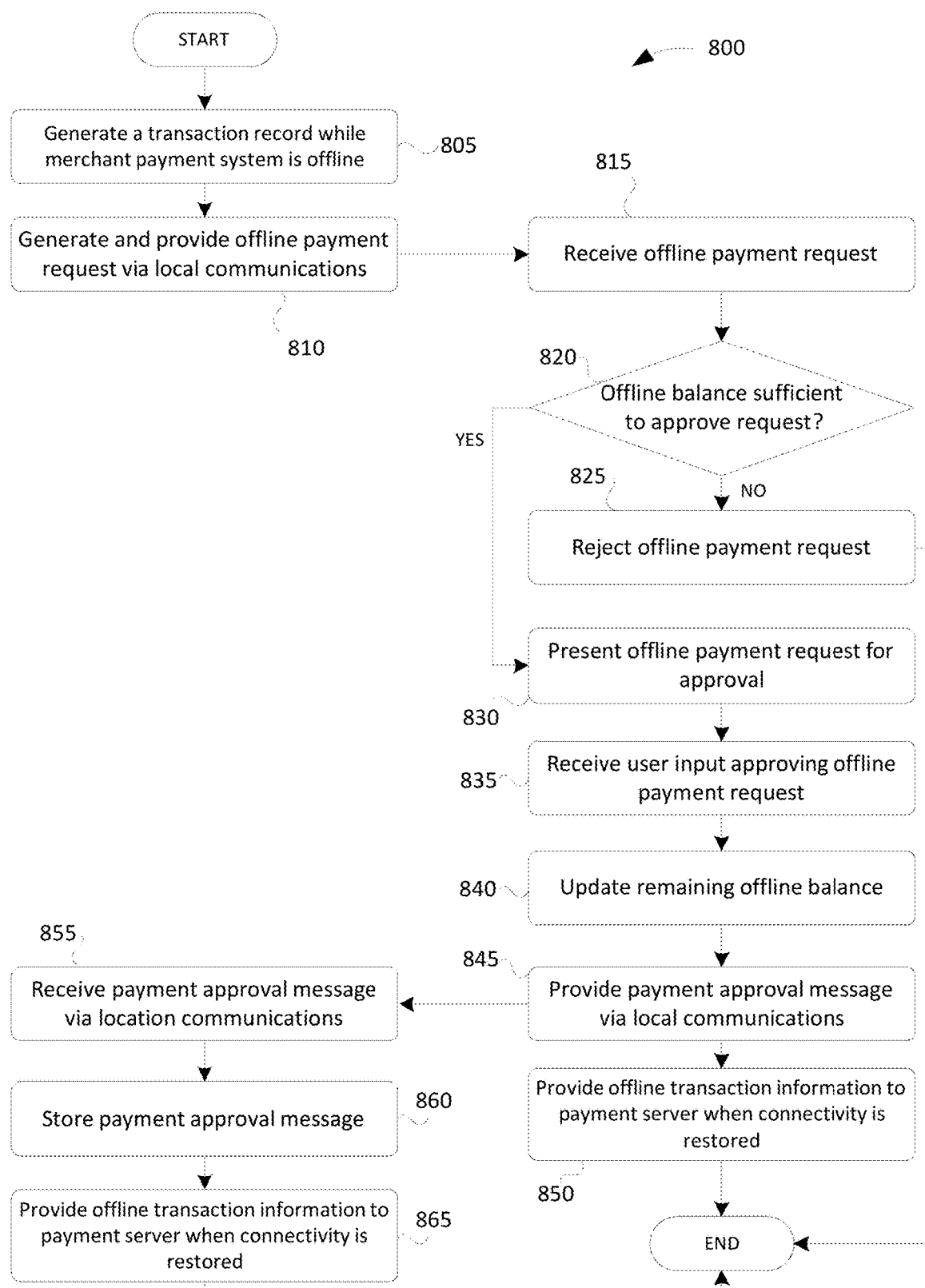
FIG. 8 shows an example flowchart for conducting and processing an offline transaction in accordance with aspects of the present invention.

FIG. 8 shows an example flowchart for conducting and processing an offline transaction in accordance with aspects of the present invention. The steps of FIG. 8 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention. In FIG. 8, process steps on the left-hand side may be performed by the merchant payment system 230 and process steps on the right-hand side may be performed by the user device 210.

As shown in FIG. 8, process 800 may include generating a transaction record while the merchant payment system is offline (step 805). For example, the merchant payment system 230 may generate a transaction record that identifies a payment amount to be paid for a transaction. In embodiments, the transaction record may include merchandise/articles scanned by the merchant payment system 230 that a buyer wishes to purchase.

Process 800 may also include generating and providing an offline payment request via local communications (step 810). For example, the merchant payment system 230 may provide the offline payment request via location communications (e.g., via the local network 260) to a user device 210 associated with a buyer of the merchandise. In FIG. 8, assume that the offline payment mode is enabled on the user device 210.

Process 800 may further include receiving an offline payment request (step 815). For example, the user device 210 may receive the offline payment request from the merchant payment system 230 through the local network 260. The offline payment request may identify an amount of the transaction. In embodiments, the offline payment request may be in the form of a QR code. In order to receive the offline payment request, the user of the user device 210 may orient a camera of the user device 210 to face the QR code displayed on the merchant payment system 230.

Process 800 may also include determining whether an offline balance is sufficient to approve the request (step 820). For example, the user device 210 may compare a transaction amount from the offline payment request with a remaining offline balance stored by the user device 210.

If, for example, the offline balance is not sufficient (step 820—NO), process 800 may further include rejecting the offline payment request (step 825). For example, the user device 210 may reject the offline payment request and display a message that the request has been denied due to insufficient offline funds.

If, on the other hand, the offline balance is sufficient to approve the request (step 820—YES), process 800 may also include presenting the offline payment request for approval (step 830). For example, the user device 210 may present the offline payment request for approval to the user via a display of the user device 210.

Process 800 may further include receiving user input approving the offline payment request (step 835). For example, the user device 210 may receive user input approving the offline payment request from the user via a user interface.

Process 800 may also include updating a remaining offline balance (step 840). For example, the user device 210 may update a remaining offline balance by subtracting the transaction amount from the offline payment request from a current offline balance. The user device 210 may store the update remaining offline balance such that future offline transactions do not exceed the remaining balance.

Process 800 may further include providing a payment approval message via local communications (step 845). For example, the user device 210 may provide the payment approval message to the merchant payment system 230 via location communications (e.g., via the local network 260) based on receiving the user input to approve the offline payment request and updating the remaining offline balance. In embodiments, the payment approval message may include an indication that the payment has been approved, an e-wallet ID of the user device 210, the transaction amount, and a payment account number. In embodiments, the payment approval message may be in the form of a QR code or computer file.

Process 800 may also include providing offline transaction information to the payment server when connectivity is restored (step 850). For example, the user device 210 may provide the offline transaction information (e.g., the payment approval message indicating that an offline transaction took place) to the payment server 220 when connectivity is restored to the payment server 220. In embodiments, the offline transaction information may include a transaction ID, an amount of the transaction, a payment account from which to deduct the transaction amount of the offline transaction, and an ID of the merchant for which the transaction amount should be credited. The payment server 220 may process the offline transaction based on receiving the offline transaction information from the user device 210. As described herein, the payment server 220 may also receive the offline transaction information from the merchant payment system 230, and may only process a transaction having the same ID once to prevent duplicative processing of a single transaction.

Process 800 may further include receiving payment approval message via local communications (step 855). For example, the merchant payment system 230 may receive the payment approval message from the user device 210 via local communications (e.g., via the local network 260). If the payment approval message is in the form of a QR code, the merchant payment system 230 may be used to scan the QR code from a display of the user device 210.

Process 800 may also include storing the payment approval message (step 860). For example, the merchant payment system 230 may store the payment approval message until connectivity to the payment server 220 is restored.

Process 800 may further include providing offline transaction information to the payment server when connectivity is restored (step 865). For example, the merchant payment system 230 may provide the offline transaction information (e.g., the payment approval message indicating that an offline transaction took place) to the payment server 220 when connectivity is restored to the payment server 220 (e.g., in a similar manner as the user device 210 provides the offline transaction information to the payment server 220 at step 850). By having each of the user device 210 and the merchant payment system 230 provide the offline transaction information, the offline transaction is processed in the fastest possible manner based on which of the user device 210 and the merchant payment system 230 restores connectivity to the payment server 220 first.

Figure 9:
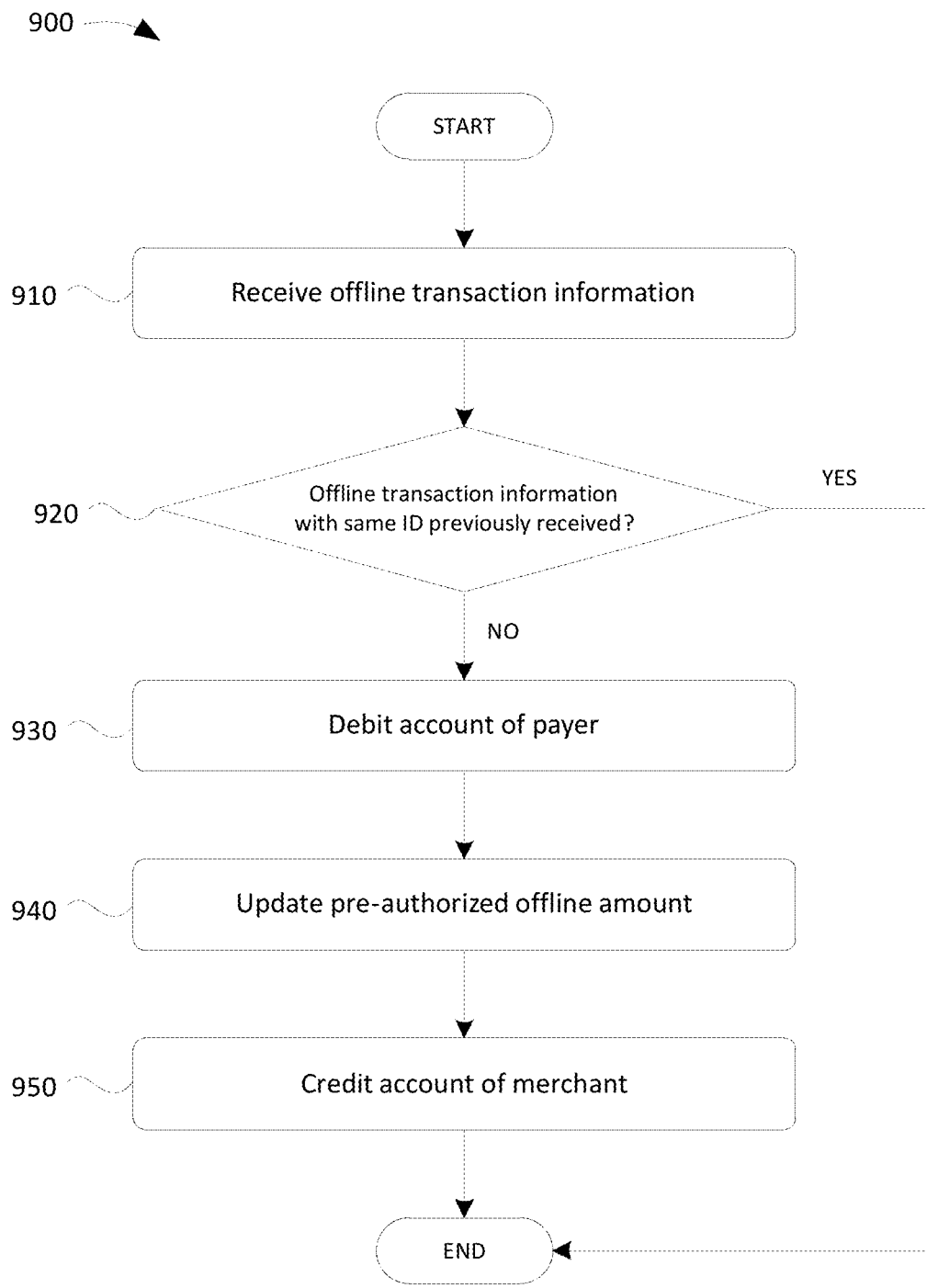
FIG. 9 shows an example flowchart for processing an offline transaction when connectivity to a payment server has been restored in accordance with aspects of the present invention.

FIG. 9 shows an example flowchart for processing an offline transaction when connectivity to a payment server has been restored in accordance with aspects of the present invention. The steps of FIG. 8 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

As shown in FIG. 9, process 900 may include receiving offline transaction information (step 910). For example, the payment server 220 may receive the offline transaction information from the user device 210 and/or the merchant payment system 230 when connectivity to the payment server 220 has been restored. In embodiments, the payment server 220 may receive the transaction information individually from each of the user device 210 and the merchant payment system 230 when connectivity is independently restored. As described herein, the offline transaction information may include an amount of the transaction, an e-wallet ID associated with the transaction, a transaction ID, a payment account, and/or a merchant ID.

Process 900 may further include determining whether offline transaction information with the same ID was previously received. For example, the payment server 220 may determine wither the same transaction ID was previously received and processed by looking up the transaction ID received in step 910 with a database that stores transaction IDs of offline payments previously received and processed. The payment server 220 may have previously received and processed an offline transaction with the same ID if the user device 210 restored its connectivity before the merchant payment system 230 and provided the payment server 220 with the offline transaction information prior to the merchant payment system 230 doing so, or vice versa.

If, for example, the payment server 220 determines that the same transaction ID was previously received (step 920—YES), process 900 may end, thereby preventing the payment server 220 from processing the offline transaction more than once. For example, the payment server 220 may ignore or discard the offline transaction information when the transaction ID was previously received. If, on the other hand, the payment server 220 determines that the same transaction ID was not previously received (step 920—NO), process 900 may include debiting an account of the payer (step 930). For example, the payment server 220 debit the account of the payer based on the offline transaction information (e.g., based on payment account information included in the offline transaction information).

Process 900 may also include updating a pre-authorized offline amount (step 940). For example, the payment server 220 may update a pre-authorized offline amount that the user has authorized to be reserved for offline purchases. The payment server 220 may update the pre-authorized amount such that the amount authorized for offline purchases is not exceeded.

Process 900 may further include crediting an account of the merchant (step 950). For example, the payment server 220 may credit an account of the merchant based on a merchant ID included in the offline transaction information.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
providing, by a merchant computing device, an offline payment request to a first user device when the merchant computing device is disconnected from a payment server, wherein the offline payment request is provided via local communications between the first user device and the merchant computing device;
receiving, by the merchant computing device, a payment approval message from the first user device associated with the offline payment request based on providing the offline payment request, wherein the payment approval message is received via the local communications between the first user device and the merchant computing device and the first user device is enabled for an offline mode;
storing, by the merchant computing device, the payment approval message; and
providing, by the merchant computing device, offline transaction information corresponding to the payment approval message to the payment server when connectivity to the payment server has been restored, the payment server including an offline status repository storing an enablement status of an offline mode for a plurality of user devices associated with an e-wallet, including the first user device, wherein the offline mode is only enabled for one of the plurality of user devices at a time to prevent offline transactions from occurring for more than one of the plurality of user devices at a time.

2. The method of claim 1, further comprising:
receiving input for a transaction; and
generating the offline payment request based on receiving the input for the transaction,
wherein the providing the offline payment request is based on generating the offline payment request.

3. The method of claim 1, wherein the offline payment request includes a quick response (QR) code.

4. The method of claim 3, wherein providing the offline payment request includes displaying the QR code for scanning by the first user device.

5. The method of claim 1, wherein the local communications includes at least one selected from the group consisting of:
a local area network (LAN);
a wireless LAN (WLAN);
a personal area network (PAN);
a Z-wave network;
a ZigBee network;
a Bluetooth network;
a near-field communications (NFC) network; and
local code scanning.

6. The method of claim 1, wherein the offline transaction information includes a transaction identifier.

7. The method of claim 1, wherein the providing the offline transaction information to the payment server causes the payment server to process the offline transaction by debiting an account associated with the first user device and crediting an account associated with the merchant computing device.

8. The method of claim 1, wherein the payment approval message includes an e-wallet identifier for an e-wallet in which an offline payment mode is active.

9. The method of claim 1, wherein a service provider at least one of creates, maintains, deploys and supports the merchant computing device.

10. The method of claim 1, wherein the providing the offline payment request, the receiving the payment approval message, the storing the payment approval message, and the providing the offline transaction information to the payment server are provided by a service provider on a subscription, advertising, and/or fee basis.

11. The method of claim 1, wherein the merchant computing device includes software provided as a service in a cloud environment.

12. The method of claim 1, further comprising deploying a system for facilitating offline transactions, comprising providing a computer infrastructure operable to perform the providing the offline payment request, the receiving the payment approval message, the storing the payment approval message, and the providing the offline transaction information to the payment server.

13. The method of claim 1, further wherein the receiving the payment approval message comprises scanning, by the merchant device, a QR code from a display of the first user device.

14. The method of claim 1, wherein the payment approval message includes an indication that payment has been approved.

15. The method of claim 1, wherein the payment approval message includes an e-wallet identification of the first user device, the transaction amount and a payment account number.

16. The method of claim 1, wherein the offline transaction information includes an amount of a transaction, an e-wallet identification, a transaction identification, and a payment amount.

17. The method of claim 1, wherein the offline transaction information includes a merchant identification.

18. The method of claim 1, wherein both the merchant computing device and the first user device provide the offline transaction information corresponding to the payment approval message to the payment server when connectivity between the payment server and the respective merchant computing device and the first user device has been restored.

19. The method of claim 1, further comprising generating, by the merchant computing device, a transaction record that identifies a payment amount to be paid for a transaction.

20. The method of claim 19, wherein the transaction record includes articles scanned by the merchant computing device during a purchase transaction of a user.

* * * * *